June 2, 1925.  
W. F. FOX  
1,540,323  
MOTION PICTURE  
Filed April 4, 1921

Inventor  
William F. Fox  
By his Attorneys  
Kenyon & Kenyon

Patented June 2, 1925.

1,540,323

UNITED STATES PATENT OFFICE.

WILLIAM FRANCIS FOX, OF NEW YORK, N. Y., ASSIGNOR TO GLENGYLE CORPORATION, OF NEW YORK, N. Y., A CORPORATION OF NEW YORK.

MOTION PICTURE.

Application filed April 4, 1921. Serial No. 458,379.

*To all whom it may concern:*

Be it known that I, WILLIAM F. Fox, a subject of the King of Great Britain, and a resident of the city, county, and State of New York, have invented certain new and useful Improvements in Motion Pictures, of which the following is a specification.

My invention relates to cinematography and particularly to the art of taking and projecting colored motion pictures.

Colored motion pictures have been heretofore made and projected, but they have possessed the disadvantages that they must be projected at a speed greater than the ordinary speed unless they are produced by an expensive process; that they cannot be satisfactorily projected as a mere black and white or two color value picture; and, that they give the impression of flickering light sometimes to such an extent as to be somewhat sickening.

It is an object of my invention to make and project colored motion pictures which may be photographed and projected at a speed nearer that at which ordinary black and white pictures are projected than has ordinarily been attained in connection with colored motion pictures.

Another object of my invention is to make motion pictures which, with proper apparatus, can be projected as colored pictures or, in the absence of such apparatus, can be projected as mere black and white pictures.

Another object of my invention is to make and project colored motion pictures with less of the flickering effect than has heretofore been prevalent.

Another object of my invention is to project pictures taken by other processes than my own in such a manner as to reduce the flickering effect without excessive speed of projection.

Another object of my invention is to prepare films for the projection of colored motion pictures in such a manner that they are given the same treatment as films intended to be projected without colors; a further object being to prepare motion picture films for the projection of colored motion pictures so that the expense of preparation will be no greater than the expense of ordinary motion picture films.

Another object of my invention is to make and project colored motion pictures in such a manner that a colored fringe or trail does not appear to follow a moving object.

Other and further objects and advantages of my invention appear from the following description taken in connection with the accompanying diagrammatic drawings and will be pointed out in the hereunto appended claims.

Figure 1:
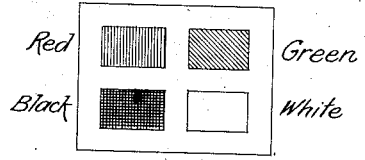
Figure 6:
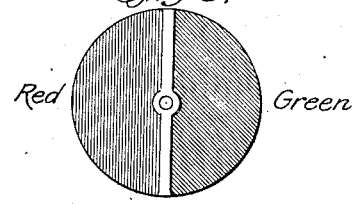
Figure 2:
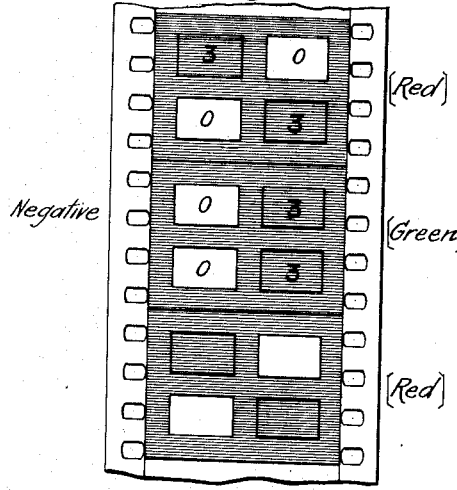
Figure 3:
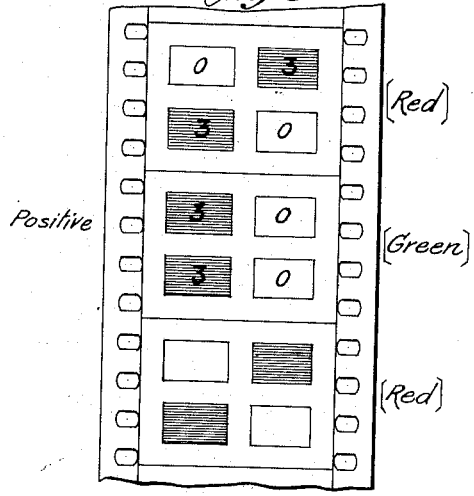
Figure 4:
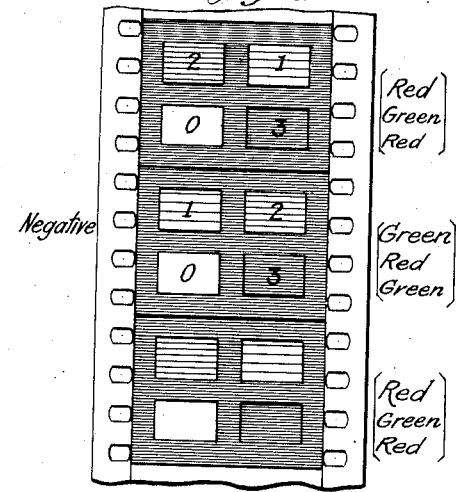
Figure 5:
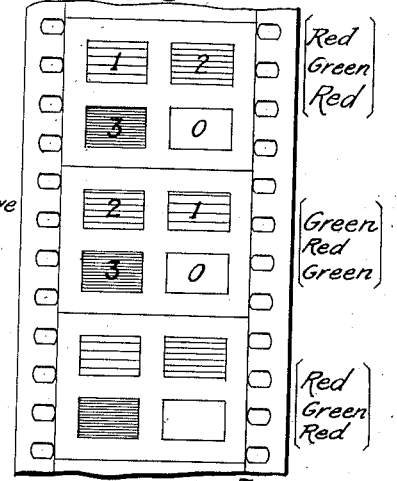

In the drawings forming a part of this specification Fig. 1 indicates diagrammatically a subject to be photographed; Fig. 2 indicates diagrammatically the densities of various portions of a motion picture negative in photographing the subject indicated in Fig. 1 in accordance with a previously known method; Fig. 3 indicates diagrammatically the density of various parts of a positive film made from the film indicated in Fig. 2; Fig. 4 indicates diagrammatically the density of various parts of the negative on which has been photographed the subject indicated in Fig. 1 by the employment of my invention; Fig. 5 indicates diagrammatically the density of various portions of a positive motion picture film made from the negative shown in Fig. 4; Fig. 6 shows the embodiment of the color screen used in photographing and projecting.

Heretofore the negative for colored motion pictures has been made by interposing in the path of the light rays passing through the lens of the camera a red filter while one picture is being taken and a green filter while the next picture is being taken and so on with alternations of the two colored filters. Thus, if the subject indicated in Fig. 1 includes red, green, black and white dots on a white background, the red and white dots, when photographed through the red filter, will have a density indicated by the index 3, in the top section of the negative shown in Fig. 2 or the same density as the white background and the green and black spots will appear white on the negative, i. e. with a density of zero, as indicated in the top section of Fig. 2. Relative densities of spots on the film are indicated by density of shading lines. The next picture, that is, the middle section of Fig. 2, is taken through the green filter and the green and white spots as taken on the negative have a density of 3 whereas the red and black spots have a density of zero. The positive of such a film would be just the reverse and the background will have a density of zero. In the picture at the top of Fig. 3, intended to be projected through the red filter, the black and green spots will have a density of 3 while the red and white spots will have a density of zero. The second picture on the positive film, taken and projected through a green filter, shows the red and black spots with a density of 3 and the green and white spots with a density of zero. The third picture is just like the first so it is apparent that the red spot will only be projected on the screen through alternate pictures. Therefore, such a film possesses the defects: first, that in order to secure the effect of persistence of color the film must be run through the camera at the rate of thirty-two (32) pictures per second in order to secure sixteen (16) projections per second, of, for example, the red spot; second, that the contrast between the undiluted red and the undiluted green, or equivalent complementary colors, is so great that even when projection is made at this high speed a flickering due to the marked color change occurs; third, that the successive pictures, being taken through screens of complementary colors, will be so different in density and therefore, so different in the degree of illumination produced upon the screen, that the flickering effect will be augmented; fourth, that the color contrast between successive pictures is so marked and extensive that when the subject moves a colored, trail or fringe will appear as trailing behind the moving subject; and fifth, that the density and hence the screen illuminating effects of the successive pictures taken through screens of complementary colors, is so pronounced that such a film cannot be projected as an ordinary black and white picture.

In accordance with my invention a negative is made upon a film having a panchromatic emulsion sensitive to the same degree to different color values or as nearly so as is practicable and during the exposure of any given picture more than one color filter of respectively different color values is passed before the lens and projection is made under the same conditions. A more specific phase of my invention consists in passing before the lens during the taking of any given picture, color screens of complementary colors and projecting the picture through the same or equivalent screens.

Successive pictures are made with a predominance of the effect of the color values of different screens. As a specific example, Fig. 4 shows diagrammatically, a negative produced by photographing the same subject indicated in Fig. 1. In making the negative shown in Fig. 4, the same type of color screen can be used as was used in making the negative indicated in Fig. 2, namely, the screen shown in Fig. 6 which is half red and half green, or the two halves are of equivalent complementary colors. In any event, reference to a red screen means any screen producing warm color values and reference to a green screen means any screen producing cold color values. The difference in the use of this screen is that during the exposure, not only the red but also the green filter, is passed before the lens. But in order that the effect of the red screen will be predominant in the taking of the picture at the top of Fig. 4 and the effect of the green screen will be predominant in the taking of the middle or succeeding picture in Fig. 4, the filter is rotated one and one-half times during the taking of each picture instead of being given one-half a revolution as in the first case described. Thus, in taking the picture at the top of Fig. 4 the red screen passes twice before the lens and the green screen passes once; the result being that the red dot will make a spot on the negative having the density 2, the green dot will make a spot having the density 1, the white dot will make a spot having the density 3, and the black dot will make a spot having the density zero, while the background has a density 3. In taking the picture shown in the middle of Fig. 4 the green screen will pass twice before the lens and the red screen will pass once, with the result that the red dot on the subject shown in Fig. 1 will make, upon the negative, a spot having the density 1, the green dot will make a spot having the density 2, the white dot will make a spot having the density 3, and the black dot will make a spot having the density zero, while the background will have the density 3. The next picture, shown at the bottom of Fig. 4, will, of course, be exactly like the picture shown at the top of Fig. 4.

The positive film shown in Fig. 5 will, of course, be the reverse of the negative shown in Fig. 4 and in the picture shown at the top, the red dot on the subject will appear as a spot having the density 1, the green dot will appear as a spot having the density 2, the black dot will appear as a spot having the density 3, the white dot will appear as a spot having the density zero, and the background will have the density zero. In the second picture, the green dot will appear as a spot having the density 1, the red dot will appear as a spot having the density 2, the black dot will appear as a spot having the density 3, the white dot will appear as a spot having the density zero, and the background will have the density zero. The third picture will, of course, be like the first.

In projecting the positive film shown in Fig. 3 the illumination upon the screen will jump from the left side of the screen when the first picture is shown and the light is passing through the red spot having the density zero, to the right side of the screen when the second picture is shown and the light is passing through the spot of zero density making the green dot. The result will be that the illumination of the right side of the screen has first full value, then zero value, then full value—and the same with the left side of the screen, only for alternate pictures. Therefore, the film must be run at twice the ordinary speed of projection, and, even then, the sharp changes from full to zero illumination produce a flicker and colored fringe or trail. But in projecting the positive shown in Fig. 5 and made in accordance with my invention, there is some illumination of the left side of the screen where the light passes through the spot made by the red dot in every picture and there is also some illumination of the right side of the screen. Although in successive pictures alternate colors will have a predominating effect to produce the proper color contrasts upon the screen by carrying the color effect from one film over to the second succeeding film by projecting a certain amount of light through the intermediate film for any given spot or color, the sharp contrast of color from picture to picture is avoided and the film may be run at a practical speed without producing a flicker or fringe.

The contrast between successive pictures taken respectively through screens of complementary colors is as marked as it is possible to make it. This condition is shown in and produced by the film shown in Fig. 3 but in the film shown in Fig. 5 the first picture is toned down toward the normal picture by being subjected to the effect of light rays through the screen other than the screen of predominating color and the second picture is toned down toward the normal picture by being subjected to the action of light rays passing through the screen having a color other than its predominating color. The normal picture would be a picture subjected to an equal amount of light through each color screen. The first and second pictures being both toned down toward normal, the contrast is greatly reduced and the flicker and fringe are avoided.

If it were attempted to project the film shown in Fig. 3 as a black and white film without color screens, the red dot, for example, would appear with full light value in one picture and with zero light value in the next picture, then with full light value in the third picture and so on, so that the maximum flicker occurs, while in projecting the picture shown in Fig. 5 as a black and white picture without color screens, the red dot, for example, would appear with a light value of 2 and then with a light value of 1, then with a light value of 2 and so forth, so that the contrast would be a very great deal less than when light values of 3, zero, 3 and so on are produced by the film shown in Fig. 3. It is therefore, apparent that a film made by my invention may be projected at a practical speed without color filters as a black and white picture.

It will, of course, be apparent that the subject diagrammatically shown in Fig. 1 is merely exemplary of a scene containing red, green, black and white spots of color and that the conditions, effects, and results above stated will apply to a scene having such spots of color.

The manner in which the blue and yellow colors are brought out is well known and needs no explanation.

It will be apparent from the foregoing that my invention involves the limiting of the rays of light passing to any section of sensitized film in taking, or through any similar section of positive film constituting a single picture, in projecting, to a plurality of different definite colors successively employed, by the successive interposition of light filters or screens to limit the rays to desired definite colors, the same colors preferably being used for successive pictures but with a different color respectively predominating for successive pictures, whereby any single section of film constituting a picture bears a record of light rays of a plurality of definite colors, the record of different colors respectively predominating, i. e. having a different density, in successive pictures.

Pictures taken by the first process herein described may be projected in the manner described in the second process with resulting reduction in flicker effect.

Numerous variations of the color values of the filters employed lie within my invention whereby the advantages above stated are fully obtained or obtained to a modified degree. For example, the specific filters referred to in the above description are red filters and green filters and one of the definite processes which I have described involves interposing in the light rays passing through the lens a red filter, a green filter, and then a red filter for one picture; and a green filter, then a red filter, and then a green filter for the next picture. But in making the pictures, the desired end is that while the record of rays of one color shall predominate in one picture and the record rays of another color shall predominate in another picture, each picture should bear record of rays of sufficient light of other colors so that the black and white contrasts in each picture shall be great enough to project a black and white picture, but between successive pictures the contrast shall not be so great that an attempt to project the film as a black and white picture will give excessive flickering. In other words, one picture may be taken with the filter giving the color value which is the substantial equivalent of two red screens and one green screen and the next picture may be taken with a filter which is the substantial equivalent of two green screens and one red one. Or one picture may be taken with a filter which passes more than one-half the spectrum and the next picture may be taken with a filter which also passes more than one-half the spectrum but which has a different predominating color from that of the screen through which the first picture was taken. The parts of the spectrum selected may overlap, and are very likely to in view of the fact that, as is well known, blue is very sparingly employed because of its very high actinic effect. In each instance the respective color segments of the filter used, correspond in value to different and limited portions only of the visible spectrum. These may be composite colors formed by combining colors which are adjacent in the spectrum or which appear in the spectrum separated by intervening colors. To distinguish from known filters using clear or uncolored segments, the present invention contemplates the use of a definite color value for each of the filter segments which may or may not be composite, but if composite, it is produced by combining such portions of the spectrum, the additive value of which is something less than white light. In any of these cases, successive pictures will bear record of different predominating colors but each picture will bear record of light rays of a sufficient number of colors to give a picture in which the densities of the different portions of the picture are so related that the picture may be projected as a black and white picture. Where colors have been mentioned as being used in my process herein described it is intended that such colors are to be used for their color value that is for the purpose of recording the effect of those particular colors rather than as a mere corrected means for one of the colors of which the effect is intended to be recorded.

From the foregoing it will be apparent that the light rays, while acting upon each image, are limited to a plurality of colors successively, that is to say, one after the other, each of which corresponds in value to a different definitely limited portion of the visible spectrum. Or, in other words, while the light acts upon each individual area, it takes a plurality of colors one after the other each of which is something less than white light. The use of light effects, in addition to those specified herein as essential to my invention, and not preventing the attainment of the objects sought thereby, in a method which nevertheless embodies my invention will come within the scope thereof. It will further be apparent that the total color effect of the colors used with respect to any given area, that is to say the total effect of the colors which occur one after another, will be different from the total color effect of the colors used with respect to the next image. This result is obtained, for example, by making one color predominate as to one area and another color as to another area.

While the particular screens used in taking the picture may be employed in projecting it one of the important features of my invention is that the color to which the light rays used in projecting is limited shall be changed during the interval of projection and more frequently than the film is changed in order that the color changes shall at least attain the frequency necessary to persistence of vision, namely, 16 per second regardless of the speed at which the successive pictures are projected.

It will be apparent from the foregoing that the light rays which act upon each successive portion of the film constituting a picture or image area, either in the taking or in the projecting of a picture, are limited to a plurality of colors one after another. It will also be apparent that the colors occur in the same order so that the light rays acting on each image area are limited to a cycle of colors, for example, red and green; and that while one color predominates as to one image area, another color will predominate with respect to the successive image area; that the cycle of colors is repeated without intermission and that the cycle is completed in less time than the interval during which the light rays act upon any given image area, for example, two-thirds of that interval.

A shutter of usual and well-known construction is contemplated for use in obscuring light during the interval of film feed. Such a shutter may be provided with an opaque segment of substantially one-half its circular area, and will properly function when timed for rotation by selected gear ratio so that the opaque section will be positioned to cover the lens as the film is advanced. Since the color screen is continuously rotated, the shutter will act to slightly reduce the effective color areas of the screen during a portion of its cyclical operation, but this interval of over-lapping is insufficient to be appreciable either in the taking or projection of pictures. In color projection work by my process, entirely satisfactory results may also be produced without the use of a shutter, the film movement being sufficiently rapid to obviate any blurring effect.

While I have referred to numerous details in order to fully disclose my invention I do not intend that my invention shall be limited thereto but do intend that it shall be defined by the hereunto appended claims.

What I claim as new and desire to secure by Letters Patent, is:

1. In cinematography the process consisting in limiting the light rays acting upon each image area of the film successively to a plurality of colors one of which predominates, said colors respectively corresponding in value to different definitely limited portions of the visible spectrum, the colors used with respect to a given area being so employed as to produce as to that area a total color effect different from the total color effect of the colors employed, with respect to the area succeeding said given area and one of the colors employed with respect to any given image area being employed also with respect to the image area succeeding said given image area.

2. In cinematography the process consisting in limiting the light rays acting upon each image area of the film successively to the same plurality of colors a different one of which predominates with respect to successive image areas, said colors respectively corresponding in value to different definitely limited portions of the visible spectrum.

3. In cinematography the process consisting in limiting the light rays acting upon each image area of the film successively to a plurality of colors one of which predominates, said colors respectively corresponding in value to different definitely limited portions of the visible spectrum, the predominating color being different for successive image areas, and one of the colors employed with respect to any given image area being also employed with respect to the image area succeeding said given image area.

4. In cinematography the process consisting in limiting the light rays acting upon each image area of the film successively to the same plurality of colors a different one of which predominates with respect to successive image areas, the light acting upon said film having at all times a color as distinguished from white light.

5. In cinematography the process consisting in limiting the light rays acting upon each image area of the film successively to a plurality of substantially complementary colors one of which predominates, the colors used with respect to a given area being so employed as to produce as to that area a total color effect different from the total color effect of the colors employed, with respect to the area succeeding said given area.

6. In cinematography the process consisting in limiting the light rays acting upon each image area of the film successively to the same plurality of complementary colors a different one of which predominates with respect to successive image areas.

7. In cinematography the process consisting in limiting the light rays acting upon each image area of the film successively to the same plurality of complementary colors a different one of which predominates with respect to successive image areas, the light acting upon each image area having at all times a color as distinguished from white light.

8. In cinematography the process consisting in limiting the light rays acting upon each image area of the film successively to a plurality of substantially complementary colors one of which predominates, the predominating color being different for successive areas.

9. In cinematography the process consisting in limiting the light rays acting upon each image area successively to red and green, said red color predominating with respect to alternate areas and said green color predominating with respect to the intervening areas.

10. In cinematography the process consisting in limiting the light rays acting upon each image area to red and green only, the light having one of said colors at a time and being periodically changed to have red color predominating as to alternate areas and said green color predominating with respect to intervening areas.

11. In cinematography the process consisting in limiting the light rays acting upon each image area successively to each of a plurality of colors respectively corresponding in value to different definitely limited portions of the visible spectrum, the color being changed more frequently than the image area changes, and a different one of said colors predominating with respect to successive areas.

12. In cinematography the process consisting in limiting the light rays acting upon each image area successively to each of a plurality of colors respectively corresponding in value to different definitely limited portions of the visible spectrum, the color being changed more frequently than the image area changes, a different one of said colors predominating with respect to successive areas, and the same colors being employed with respect to each image area.

13. In cinematography the process consisting in limiting the light rays acting upon each image area successively to each of a plurality of colors respectively corresponding in value to different definitely limited portions of the visible spectrum, the light being limited to one of said colors during a greater proportion of the interval in which it acts upon each image area, than it is to another color, one of the colors employed with respect to any given image area being employed also with respect to the image area succeeding said given area and the colors used with respect to a given area being so employed as to produce as to that area a total color effect different from the total color effect of the colors employed with respect to the area succeeding said given area.

14. In cinematography the process consisting in limiting the light rays acting upon each image area successively to each of a plurality of colors respectively corresponding in value to different definitely limited portions of the visible spectrum, the light being limited to one of said colors during a greater proportion of the interval in which it acts upon each image area, than it is to another color, the color to which the light is limited during said greater proportion of said interval being different with respect to successive image areas, one of the colors employed with respect to any given image area being employed also with respect to the image area succeeding said given image area.

15. In cinematography the process consisting in limiting the light rays acting upon each image area successively to each of two colors respectively corresponding in value to different definitely limited portions of the visible spectrum, the light being limited to one of said colors during the major proportion of each of the intervals in which it acts upon alternate areas and to the other of said colors during the major proportion of each of the intervals in which it acts upon intervening areas, one of the colors employed with respect to any given image area being employed also with respect to the image area succeeding said given image area.

16. In cinematography the process consisting in limiting the light rays acting upon each image area successively to each of two colors respectively corresponding in value to different definitely limited portions of the visible spectrum, the light being limited to one of said colors during the major proportion of each of the intervals in which it acts upon alternate areas and to the other of said colors during the major proportion of each of the intervals in which it acts upon intervening areas, said major portions being substantially equal with respect to successive areas, one of the colors employed with respect to any given image area being employed also with respect to the image area succeeding said given image area.

17. In cinematography the process consisting in subjecting each image area to light rays for a definite interval of time, the light rays employed being limited to a cycle of colors comprising a plurality of colors successively employed, and repeating said cycle of colors without intermission and at such rate that the completion of said cycle requires a lesser interval of time than that during which each image area is acted upon by light rays.

18. In cinematography the process consisting in limiting the light rays acting upon each image area of the film successively to a plurality of colors one of which predominates, said colors respectively corresponding in value to different definitely limited portions of the visible spectrum, the colors used with respect to a given area being so employed as to produce as to that area a total color effect different from the total color effect of the colors employed with respect to the area succeeding said given area and one of the colors employed with respect to any given image area being employed also as the predominating color with respect to the image area succeeding said given image area.

19. In cinematography the process consisting of exposing each section of sensitized film respectively constituting a picture to light rays successively limited to each of a plurality of colors respectively corresponding in value to different definitely limited portions of the visible spectrum, the several colors employed being the same for successive pictures, and a different one of said colors predominating during the taking of successive pictures.

20. In cinematography the process consisting of exposing each section of sensitized film respectively constituting a picture to light rays successively limited to each of a plurality of colors respectively, corresponding in value to different definitely limited portions of the visible spectrum, a different one of said colors predominating during the taking of successive pictures, the predominating colors being substantially complementary.

21. In cinematography the process consisting of exposing each section of sensitized film respectively constituting a picture to light rays successively limited to each of a plurality of substantially complementary colors, a different one of said colors predominating during the taking of successive pictures.

22. In cinematography the process consisting of exposing each section of sensitized film respectively constituting a picture to light rays successively limited to a plurality of substantially complementary colors, the several colors employed being the same for successive pictures, and a different one of said colors predominating during the taking of successive pictures.

23. In cinematography the process consisting in limiting the light rays acting upon each image area of the film successively to a plurality of substantially complementary colors one of which predominates, the colors used with respect to a given area being so employed as to produce as to that area a total color effect different from the total color effect of the colors employed with respect to the area succeeding said given area and one of the colors employed with any given image area being also employed with respect to the image area succeeding said given image area.

24. In cinematography the process consisting in exposing each section of sensitized film constituting a picture to light rays the color value of which is varied through a sufficient portion of the spectrum to give each picture sufficient density to be projected as a black and white picture, light rays of a different portion of the spectrum predominating for respectively successive pictures, and of the same portion of the spectrum for alternate pictures.

25. In cinematography the process consisting in exposing each section of sensitized film constituting a picture to light rays having a color value of a sufficient portion of the spectrum to give each picture sufficient density to be projected as a black and white picture, light rays of a different portion of the spectrum predominating for respectively successive pictures and of the same portions of the spectrum for alternate pictures, making a positive of a negative so formed, and projecting such positive with changes of color screen occurring at greater frequency than the changes of pictures being projected.

26. In cinematography the process consisting in limiting the light rays acting upon each image area of the film successively to a plurality of colors one of which predominates, said colors respectively corresponding in value to different definitely limited portions of the visible spectrum, the colors used with respect to a given area being so employed as to produce as to that area a total color effect different from the total color effect of the colors employed with respect to the area succeeding said given area and the color predominating with respect to any given image area being employed also with respect to the image area succeeding said given image area.

27. In cinematography the process consisting in limiting the light rays acting upon each image area of the film successively to a plurality of colors respectively corresponding in value to limited portions of the visible spectrum, a color employed with respect to a given area being employed also with respect to the area succeeding said given area and the colors used with respect to a given area being so employed as to produce as to that area a total color effect different from that of the colors employed with respect to the area next succeeding said given area and the same as that of the colors employed with respect to the second succeeding area.

28. In cinematography the process of recording color values upon a film strip by use of color screens moving at substantially uniform speed, which consists in limiting the light rays acting upon each image area of the film successively to a plurality of substantially complementary colors one of which predominates, the predominating color being different for successive areas.

29. In cinematography the process consisting in limiting the light rays acting upon each image area of the film by use of color screens moving at substantially uniform speed, so that a plurality of colors are successively employed with regard to each area and a different one of which predominates with respect to successive image areas, said colors respectively corresponding in value to different definitely limited portions of the visible spectrum.

30. In cinematography the process consisting in subjecting each image area to light rays for a definite interval of time and through a color screen moving at substantially uniform speed, the light rays employed being limited to a cycle of colors comprising a plurality of substantially complementary colors successively employed, the cycle of colors being completed in a shorter interval of time than that during which each image area is acted upon by light rays.

In testimony whereof, I have signed my name to this specification.

WILLIAM FRANCIS FOX.